United States Patent

Schittenhelm et al.

[11] Patent Number: 5,145,804
[45] Date of Patent: Sep. 8, 1992

[54] ENAMEL POWDER FOR ELECTROSTATIC APPLICATION

[75] Inventors: Hans-Joachim Schittenhelm, Leverkusen; Werner Joseph, Cologne, both of Fed. Rep. of Germany

[73] Assignee: Bayer Aktiengesellschaft, Leverkusen-Bayerwerk, Fed. Rep. of Germany

[21] Appl. No.: 132,976

[22] Filed: Dec. 15, 1987

Related U.S. Application Data

[63] Continuation of Ser. No. 842,901, Mar. 24, 1986, abandoned.

[30] Foreign Application Priority Data

Apr. 4, 1985 [DE] Fed. Rep. of Germany ....... 3512336

[51] Int. Cl.$^5$ ............ C03C 8/02; C03C 8/06; C03C 8/08
[52] U.S. Cl. .................... 501/21; 501/24; 501/25
[58] Field of Search ............ 501/21, 24, 25, 14, 501/18

[56] References Cited

U.S. PATENT DOCUMENTS

| | | | |
|---|---|---|---|
| 4,110,487 | 8/1978 | Rion | 427/27 |
| 4,265,929 | 11/1979 | Wagner et al. | 427/33 |
| 4,361,654 | 11/1982 | Ohmura et al. | 501/21 |
| 4,847,218 | 7/1989 | Schittenhelm et al. | 501/21 |
| 4,970,178 | 11/1990 | Klimas et al. | 501/25 |
| 5,013,362 | 5/1991 | Joseph et al. | 501/24 |

FOREIGN PATENT DOCUMENTS 768069  7/1971  Belgium .................. 501/21

OTHER PUBLICATIONS

Ceramic engineering and science proceedings, May–Jun. 1986 pp. 654–662.

*Primary Examiner*—Theodore Morris
*Assistant Examiner*—David M. Brunsman
*Attorney, Agent, or Firm*—Connolly and Hutz

[57] ABSTRACT

Enamel frit powder for electrostatic application with a surface resistance greater than $10^{16}$ ohms containing alkaline oxides and alkaline oxides wherein the weight ratio of the alkaline oxides $Na_2O:K_2O$ and the weight ratio of the alkaline earth oxides $CaO:BaO$ is each about 1:1, containing

| | % by weight |
|---|---|
| $SiO_2$ | 36–40 |
| $Al_2O_3$ | 0–4 |
| $B_2O_3$ | 12–16 |
| $Na_2O$ | 7–9 |
| $K_2O$ | 7–9 |
| $ZrO_2$ | 5–10 |
| $CaO$ | 4–6 |
| $BaO$ | 4–6 |
| $P_2O_5$ | 0–1 |
| $CoO$ | 1 |
| $NiO$ | 2 |
| $MnO$ | 0–2 |
| $CuO$ | 0–2 |
| $F$ | 0.1. |

2 Claims, No Drawings

ENAMEL POWDER FOR ELECTROSTATIC APPLICATION

This is a continuation of copending application Ser. No. 842,901 filed Mar. 24, 1986, abandoned.

The present invention relates to enamel powder for electrostatic powder application with superior coating properties for geometrically difficult shaped workpieces in areas of low density of the lines of electric flux.

BACKGROUND OF THE INVENTION

A precondition for the electrostatic powder application of enamel frits with good powder adhesion is the use of a high electric surface resistance of the powder as well as good powder fluidity during the application of the enamel particles on the metal workpiece. To regulate the necessary surface resistance, enamel frits according to DE-PS 2 015 072 are coated with special insulating substances capable of reacting with Si—OH groups of the frit particles. The encapsulant is preferably added during the grinding process.

The fluidity of the powder necessary for the continuous powder application in industrial plants is substantially dependent on the composition of the frits used, their particle size as well as the type and concentration of the encapsulant. For determining the powder fluidity it was proposed to entrain a specific quantity of powder in a defined air stream and after setting up a fluidized bed of constant depth, to weight out, after a certain time, the powder quantity flowing out through a side opening. The weight of the powder flowing out is a measure for the fluidity of the powder (Lambert, Email Metal, 24, 1975, 19 et seq.).

When coating geometrically difficult shaped parts, for example in hollow spaces, insufficient powder deposition takes place, particularly in the corners in areas of low density of the lines of electric flux.

The same applies when edges are impressed onto or flanges are welded onto flat parts. The uneven powder application is particularly noticeable in color variations in these critical areas of low density of the lines of electric flux after firing the powder. In unfavorable cases, a too low enamel layer density results in the known burn off because of incomplete oxide dissolution in the glass.

An increase in the charging agent concentration does indeed generally improve the powder penetration and reduce the described defects, but simultaneously reduces the fluidity of the powder.

BRIEF DESCRIPTION OF THE INVENTION

It has surprisingly now been found that the powder penetration can be improved without sacrificing the powder fluidity by increasing the surface resistance of the enamel powder.

The present invention thus provides enamel powder for electrostatic application, particularly in the areas of low density of the lines of electric flux, with a surface resistance of greater than $10^{16}\,\Omega$.

DETAILED DESCRIPTION

The enamel frits used according to the invention for achieving the "high ohmic" enamel powders according to the invention are characterised by a determined ratio of the oxide composition of the frit formula alkali and alkaline earth oxides used as well as by a low fluoride and $P_2O_5$ content.

With the powder enamels according to the invention (ground coat and direct on enamel frits) the weight ratio of sodium and potassium oxide is about 1:1, the weight ratio of calcium and barium oxide is likewise approaching 1:1. The fluorine and $P_2O_5$ content is below 2%, preferably below 1%.

The powder enamels according to the invention are characterised by a particularly good reactivity with methyl hydrogen siloxanes. They surprisingly produce a powder resistance of greater than $10^{16}\,\Omega$ in the case of common grinding with methyl hydrogen siloxanes.

Their surface resistance is $10^2$ to $10^4$ ohms higher than commercial ground coat and direct on enamels produced under the same conditions with the same charging agent, although the resistance of the pulverized frits ground without additives, resulting $10^8$ to $10^{10}\,\Omega$, is no higher than in the case of commercial frits.

The frits according to the invention are characterised by substantially improved powder penetration, which is noticeable in a uniform layer in all areas of the workpiece. The described defects caused by differing powder coating thickness are thus eliminated.

A typical enamel frit has, for example, the following composition:

|  | % by weight |
| --- | --- |
| $SiO_2$ | 36–40 |
| $Al_2O_3$ | 0–4 |
| $B_2O_3$ | 12–16 |
| $Na_2O$ | 7–9 |
| $K_2O$ | 7–9 |
| $ZrO_2$ | 5–10 |
| CaO | 4–6 |
| BaO | 4–6 |
| $P_2O_5$ | 0–1 |
| CoO | 1 |
| NiO | 2 |
| MnO | 0–2 |
| CuO | 0–2 |
| F | 0–1 |

A measure for the powder penetration is the deposition rate of a powder enamel onto a steel substrate without applying an electric potential. Hereto, the enamel powder is sprayed onto sample plates under defined conditions using commercial powder pistols with a constant quantity of conveying air. The deposited powder mass is determined as a function of the time. The enamel quantity applied in a currentless state is a measure for the powder penetration. This is all the better the more enamel is deposited on the sample plate and correlates with experiments in practice when applying a high potential to the powder pistols.

The subject of the present invention will now be explained in more detail by means of the following example.

EXAMPLE

An enamel frit of corresponding raw materials with the following oxidic composition:

|  | % by weight |
| --- | --- |
| $SiO_2$ | 40 |
| $Al_2O_3$ | 3 |
| $B_2O_3$ | 15 |
| $Na_2O$ | 9 |
| $K_2O$ | 9 |
| $ZrO_2$ | 8 |
| CaO | 6 |

-continued

|  | % by weight |
|---|---|
| BaO | 6 |
| CoO | 1 |
| NiO | 2 |
| MnO | 1 | is melted in a chamotte crucible in an electrically heated kiln at 1200° C. After a residence time of 20 min, the clear melt is quenched between water-cooled steel rolls. The flakes obtained in this manner are ground in a porcelain ball mill under addition of 0.35% by weight of methyl hydrogen siloxane for a duraction such that 80% of the resulting powder has a particle size of less than 40 μm. The obtained frit-powder has a resistance of $5 \times 10^{16}$ Ω.

For determining the deposition rate of various enamel powders, the methods described in the publications by Vdefa 1984, p. 137 et seq. are referred to.

A commercial powder enamel with a surface resistance of $10^{12}$ (powder A) and the high ohmic enamel powder according to the invention with a surface resistance of $5 \times 10^{16}$ (powder B) are hereby in each case filled into the cup of a pistol suitable for electrostatic enamel application.

With these powders, a constant powder flow is established in the potential free state under equal application parameters, and is sprayed onto a $20 \times 20$ cm steel plate.

During spraying, the weight increase of the plate is determined and recorded on a weighing device according to the spraying time.

The result of these comparative experiments is shown in the following Table:

| Enamel Powder | Deposited quantity (in g) after sec. | | | |
|---|---|---|---|---|
|  | 10 | 20 | 30 | 40 |
| A | 1.5 | 2.5 | 3 | 3.5 |
| B | 6 | 12 | 17 | 23 |

It is obvious from this that the quantities of the powder B according to the invention deposited in same time are substantially higher than that of the commercial powder enamel A.

The powder quantity deposited in a currentless state is a measure for the powder penetration, that means the powder deposition in the areas of low density of the lines of electric flux.

The high ohmic powder produced according to the invention has the same thickness after powder deposition onto geometrically unfavorable shaped working pieces, compared with plane surfaces.

What is claimed is:

1. Enamel frit powder for electrostatic application with a surface electrical resistance greater than $10^{16}$ ohms containing alkaline oxides and alkaline earth oxides wherein the weight ratio of the alkaline oxides $Na_2O:K_2O$ and the weight ratio of the alkaline earth oxides $CaO:BaO$ is each about 1:1 containing:

|  | % by weight |
|---|---|
| $SiO_2$ | 36–40 |
| $Al_2O_3$ | 0–4 |
| $B_2O_3$ | 12–16 |
| $Na_2O$ | 7–9 |
| $K_2O$ | 7–9 |
| $ZrO_2$ | 5–10 |
| CaO | 4–6 |
| BaO | 4–6 |
| $P_2O_5$ | 0–1 |
| CoO | 1 |
| NiO | 2 |
| MnO | 0–2 |
| CuO | 0–2 |
| F | 0–1. |

2. Enamel frit powder for electrostatic application with a surface electrical resistance greater than $10^{16}$ ohms consisting essentially of:

| 36–40% | by weight | $SiO_2$ |
|---|---|---|
| 0–4% | by weight | $Al_2O_3$ |
| 12–16% | by weight | $B_2O_3$ |
| 7–9% | by weight | $Na_2O$ |
| 7–9% | by weight | $K_2O$ |
| 5–10% | by weight | $ZrO_2$ |
| 4–6% | by weight | CaO |
| 4–6% | by weight | BaO |
| 0–1% | by weight | $P_2O_5$ |
| 1% | by weight | CoO |
| 2% | by weight | NiO |
| 0–2% | by weight | MnO |
| 0–2% | by weight | CuO |
| 0–1% | by weight | F | and wherein the weight ratio of $Na_2O:K_2O$ is about 1:1 and the weight ratio of $CaO:BaO$ is about 1:1 and which has been ground in the presence of methyl hydrogen siloxane.

* * * * *